United States Patent [19]

Kreft et al.

[11] Patent Number: 4,457,082
[45] Date of Patent: Jul. 3, 1984

[54] HEAT EXCHANGER

[75] Inventors: Wilfried Kreft, Ennigerloh; Wolfgang Rother, Stromberg; Peter Tiggesbauneker, Oelde; Karl Menzel, Beckum; Herbert Schmelter, Ennigerloh; Heinrich Weber, Beckum, all of Fed. Rep. of Germany

[73] Assignee: Krupp Polysius AG, Beckum, Fed. Rep. of Germany

[21] Appl. No.: 359,198

[22] Filed: Mar. 18, 1982

[30] Foreign Application Priority Data

Mar. 24, 1981 [DE] Fed. Rep. of Germany ....... 3111527

[51] Int. Cl.³ ............................................. F26B 17/14
[52] U.S. Cl. .................................... 34/57 E; 432/58; 34/57 A; 55/452; 55/459 R
[58] Field of Search ............ 34/10, 57 R, 57 E, 57 A; 432/15, 58; 55/452, 459 R

[56] References Cited

U.S. PATENT DOCUMENTS 3,259,997  7/1966  Muller ................................. 34/57 E
3,364,589  1/1968  Muller ................................. 34/57 E
3,392,513  7/1968  Hedin ............................... 55/459 R

FOREIGN PATENT DOCUMENTS 1280486  10/1968  Fed. Rep. of Germany .

Primary Examiner—Larry I. Schwartz
Attorney, Agent, or Firm—Learman & McCulloch

[57] ABSTRACT

The invention relates to a multiple-stage heat exchanger 1 in which at least one of the lower heat exchange stages contains a deflector/separator with a horizontal gas inlet pipe and a gas outlet, and at least the upper heat exchange stage has a conventional cyclone. This results in a considerable reduction in the energy requirement, the size and height of the construction.

7 Claims, 5 Drawing Figures

HEAT EXCHANGER

BACKGROUND OF THE INVENTION

The invention relates to a multiple-stage heat exchanger for heat treatment of fine-grained material with a hot gas stream which flows upwards through several heat exchange stages arranged one above the other. Material is supplied to the heat exchanger from above and is repeatedly separated from the gas stream and then reintroduced to the heat exchange stage immediately below. At least one of the lower heat exchange stages contains a deflector/separator having gas inlet and outlet pipes offset relative to each other on the periphery of the deflector/separator and arranged at a different height above a hopper. At least the uppermost heat exchange stage has a cyclone with a horizontal gas inlet pipe and a vertical dip pipe.

Known heat exchangers for preheating fine-grained material (for instance crude cement powder) before a burning or sintering process consist of a number of cyclones which are connected to each other via their gas and material delivery lines and are passed through successively by the material in counterflow to the hot gas. The connection of several cyclone stages one behind the other results—over the whole heat exchanger—in an almost ideal counterflow of gas and material and thus a very high degree of thermal efficiency in the transfer of heat.

The known constructions have the disadvantage that they have a relatively high energy requirement in order to overcome the great resistance to flow of the numerous cyclone stages. The considerable size, and particularly the great height, of such a multiple-stage heat exchanger is also unfavourable.

A multiple-stage heat exchanger is also known (German Auslegeschrift No. 1280486) which contains a deflector/separator in three heat exchange stages and a cyclone in the last stage. In plan view the deflector/separators have a rectangular expansion chamber with a funnel-shaped base into which an inlet channel for the hot gas stream opens on one side from below and an exhaust channel leads out upwards on the opposite side, and a delivery pipe for the material eliminated in the stage immediately above opens in the cover of the chamber.

A deflector/separator of this type has a substantially lower pressure loss than a conventional cyclone, but on the other hand it has the disadvantage of a very poor degree of separation. A further serious disadvantage of this known arrangement is that the material introduced into the deflector/separator via the cover of the expansion chamber is in contact with the hot gas stream for quite a short time before it is eliminated from the gas stream in the expansion chamber; this results in a poor degree of heat transfer.

SUMMARY OF THE INVENTION

An objective of this invention is to provide a multiple-stage heat exchanger of the type referred to which avoids the disadvantages of the known constructions and which is distinguished by a good degree of separation and a low pressure loss and thus by a good degree of thermal efficiency, a comparatively low energy requirement, and a reduced size.

This objective is achieved according to the invention by the following features:

(a) the deflector/separators have an upper portion of cylindrical cross-section above their hoppers;

(b) the gas inlet pipe is connected tangentially onto the cylindrical upper portion of the deflector/separator;

(c) the material delivery lines of the individual heat exchange stages open into the gas line leading to the respective gas inlet pipe of the deflector/separator of the heat exchange stage immediately below.

Exhaustive tests have shown that in the deflector/separator according to the invention the elimination of the material from the gas stream takes place basically in three phases:

1. solid material is eliminated by centrifugal force when the gas stream containing the material is tangentially introduced into the cylindrical upper portion of the deflector/separator;

2. a further elimination of dust takes place by gravity upon subsequent movement of the gas stream containing the material in the interior of the deflector/separator;

3. in a third phase of material removal dust is eliminated by centrifugal force on deflection of the gas stream caused by the different heights of the gas inlet and outlet pipes.

The deflector/separator used in the heat exchanger according to the invention thus combines the substantial advantages of the known gas cyclone (high degree of separation) with those of the deflector/separator (low pressure loss), but avoids their disadvantages. In fact the degree of separation of the deflector/separator used according to the invention is only slightly worse than that of a conventional cyclone, and the degree of thermal efficiency is only negligibly reduced. Because the pressure loss in the deflector/separator according to the invention is significantly lower than that of a cyclone, the overall energy requirement is significantly reduced. The invention makes use of the knowledge that in a cyclone the majority of the solid material is eliminated during the first circulation or by one single gas stream deflection, whilst the elimination of the small remaining quantity of solid material requires a number of circulations which represent the majority of the pressure loss.

By comparison with the known deflector/separators described above (with rectangular cross-section and material delivery through the cover of the separator) the deflector/separator according to the invention is distinguished by a substantially prolonged contact between material and gas—and thus an improved heat transfer—and by a quite considerably improved elimination of the solid material.

DESCRIPTION OF THE DRAWINGS

Advantageous embodiments of the invention are illustrated in the accompanying drawings in which.

THE PREFERRED EMBODIMENTS

Figure 1:
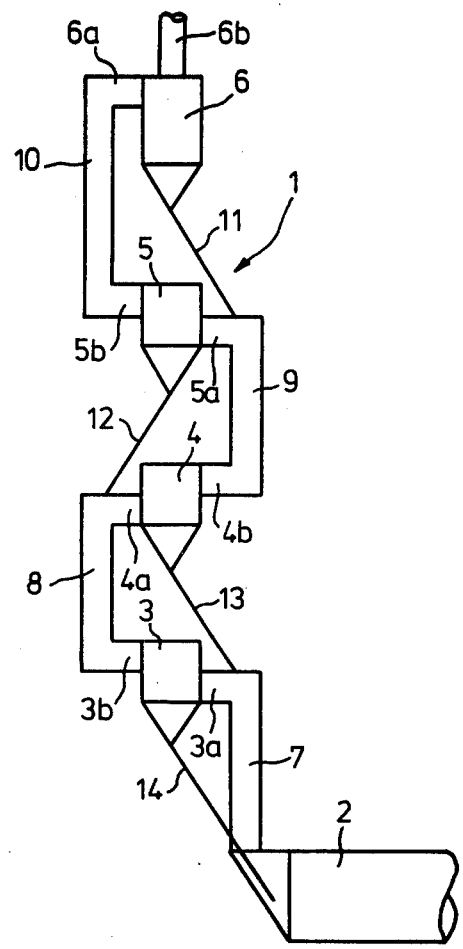
FIG. 1 is a schematic elevational view of a multiple-stage heat exchanger (with associated rotary kiln)

The heat exchanger 1 shown in schematic form in FIG. 1 serves for the preheating of fine-grained material which is then burnt or sintered in a rotary kiln 2. The heat exchanger 1 consists of four heat exchange stages arranged one above the other, of which the three lower stages contain deflector/separators 3, 4 and 5 and the uppermost stage contains a cyclone 6. A gas line 7 supplies the hot exhaust gas from the rotary kiln 2 to the deflector/separator 3. A gas line 8 connects the deflector/separators 3 and 4, a gas line 9 connects the deflector/separators 4 and 5, and a gas line 10 connects the deflector/separator 5 to the cyclone 6. Material delivery lines 11, 12, 13 and 14 take the material eliminated in the cyclone 6 or in the deflector/separators 3, 4 and 5, respectively, to the gas line of the stage immediately below in each case (or—in the case of the material delivery line 14—to the rotary kiln 2).

The cyclone 6 provided in the uppermost stage of the heat exchanger 1 is provided in a known manner with a horizontal gas inlet pipe 6a and a vertical dip pipe and gas outlet pipe 6b. The deflector/separators 3, 4 and 5 by contrast have gas inlet pipes 3a, 4a, 5a, respectively, and gas outlet pipes 3b, 4b, 5b, respectively, arranged at different heights in the horizontal plane.

Figure 2:
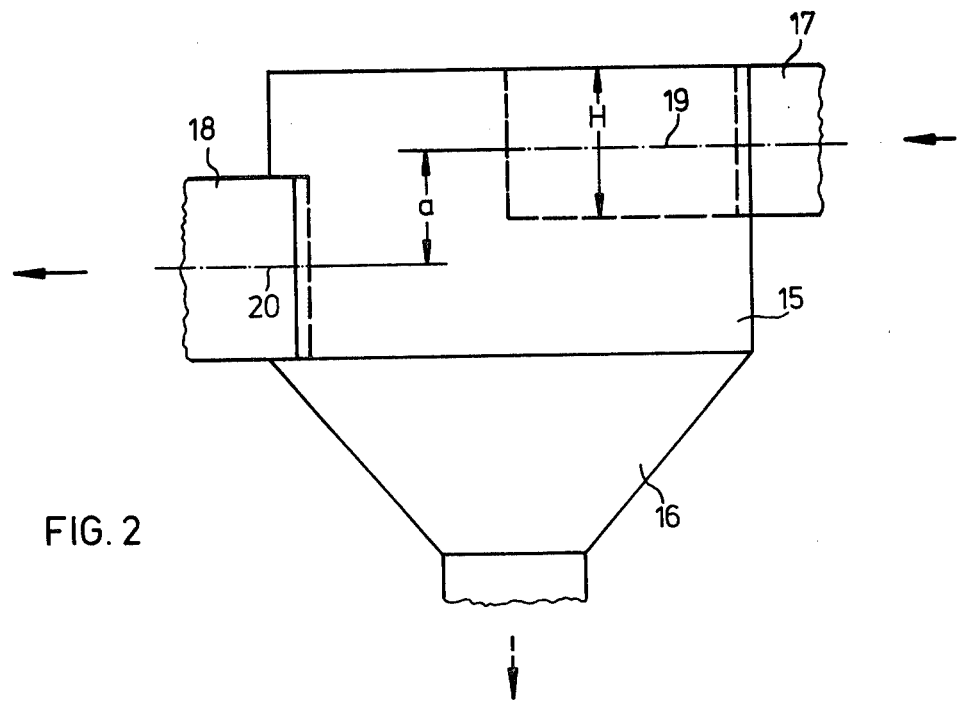
FIGS. 2 and 3 are a side elevational view and plan view, respectively, of a first embodiment of a deflector/separator.
Figure 3:
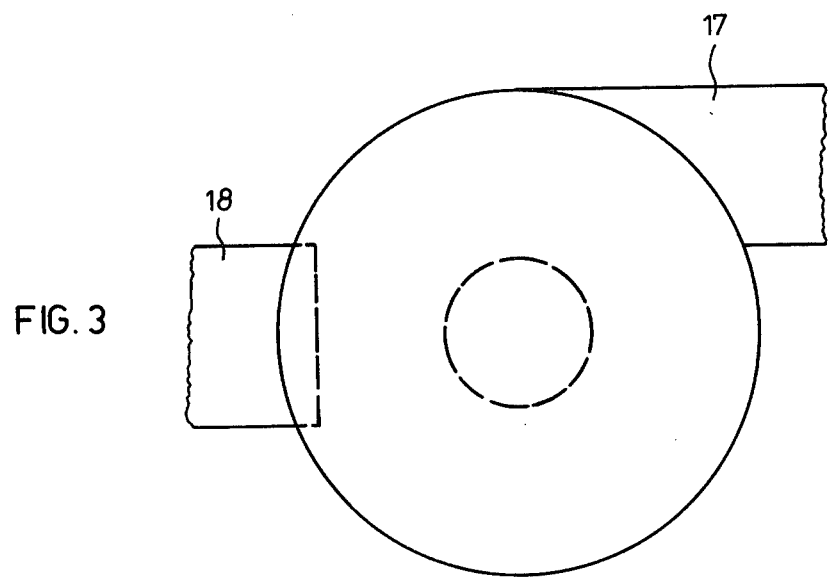

In the embodiment according to FIGS. 2 and 3 the deflector/separator contains an upper cylindrical portion 15 and a lower eliminating hopper 16. A gas inlet pipe 17 is connected tangentially and a gas outlet pipe 18 is connected radially onto the upper cylindrical part. These two pipes are arranged at different heights in horizontal planes having horizontal axes 19,20. The distance a between the axes 19,20 amounts to about 0.5 to 1.0 times, and preferably 0.6 to 0.8 times the height H of the gas inlet pipe 17. In this embodiment the gas inlet pipe 17 is at a higher level than that of the gas outlet pipe 18.

The planes of the gas inlet pipe 17 and the gas outlet pipe 18 are offset relative to each other on the periphery of the deflector/separator. In the illustrated embodiment they are offset, but parallel so that the inlet and outlet paths are approximately 180° from each other. It is possible, however, for the planes to be offset a smaller amount, for example, approximately 90°.

Figure 4:
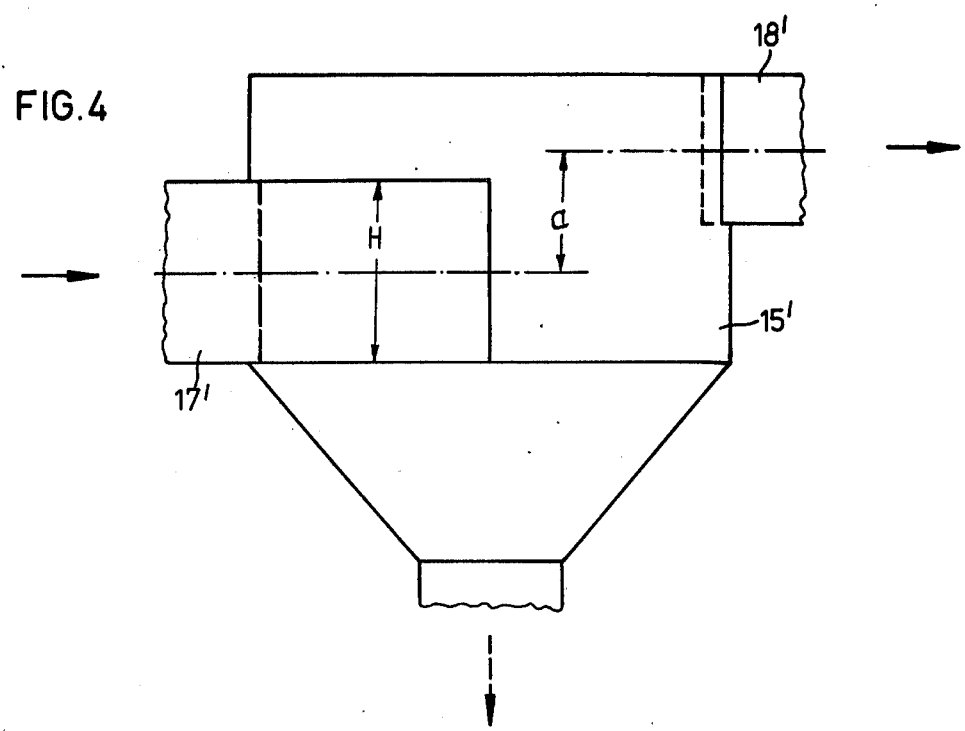
FIGS. 4 and 5 are a side elevational view and plan view, respectively, of a modified embodiment of the deflector/separator according to the invention.
Figure 5:
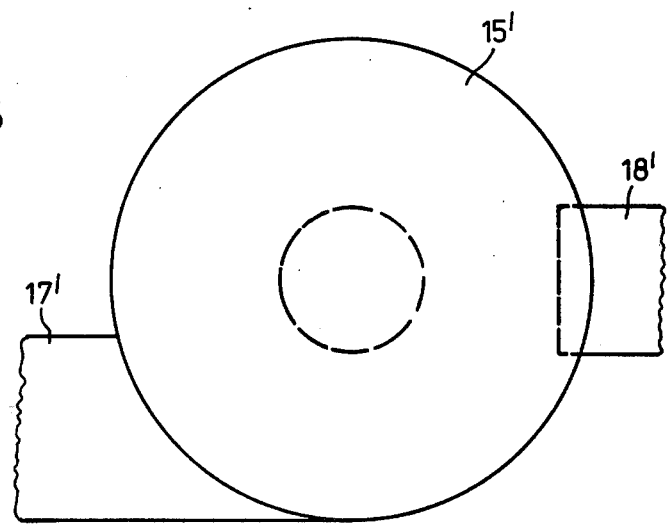

In the embodiment according to FIGS. 4 and 5 a gas inlet pipe 17' is connected tangentially and a gas outlet pipe 18' is connected radially onto the upper cylindrical part 15' of the deflector/separator, but in this embodiment the gas inlet pipe 17' is at a lower level than that of the gas outlet pipe 18'.

Flow line tests gave the following optimum geometric ratios for a deflector/separator according to FIGS. 2 and 3:

a. The ratio of height to width of the gas inlet pipe=1.5
b. The ratio of inlet to outlet cross-section=0.85
c. The ratio of the diameter of the cylindrical upper part of the deflector/separator to the diameter of the gas outlet pipe=1.5:1 or 1:0.66
d. The ratio of the height to the diameter of the cylindrical upper part=1.0 to 1.3
e. The cone angle of the hopper=50°
f. The ratio of the depth of immersion to diameter of the gas outlet pipe=0.6

The following comparison (in relative figures) between the data for a conventional cyclone and a deflector/separator according to the invention as shown in FIGS. 2 and 3 illustrate the technical advance achieved by the invention;

|  | Conventional cyclone | Deflector-separator according to the invention |
|---|---|---|
| Volume | 100 | 65 |
| Height | 100 | 75 |
| Degree of separation | 100 | 85 |
| Pressure loss | 100 | 70 |
| Electrical energy requirement | 100 | 70 |

Since the degree of separation of the deflector/separator according to the invention is between 70 and 95% depending upon the layout, the degree of thermal efficiency of the heat exchanger is hardly restricted. The guiding of the flow in the deflector/separator according to the invention is substantially simpler than in a cyclone and results in a drastic reduction of the energy requirement and a considerable decrease in the height and volume of the construction. These advantages are particularly noticeable in large plants where they provide a considerable reduction in the construction and maintenance costs.

As FIGS. 3 and 5 show, the gas outlet pipe can partially project into the interior of the cylindrical part of the deflector/separator in the form of a dip pipe. The optimum depth of dipping is conveniently determined by experimentation.

What is claimed is:

1. In a multiple-stage heat exchanger for heat treatment of fine-grained material wherein a hot gas stream flows upwards through the heat exchanger containing several heat exchanger stages arranged one above the other, and wherein material is supplied to the heat exchanger from above and is repeatedly separated from the gas stream and then reintroduced to the heat exchange stage immediately below, and wherein at least one of the lower heat exchange stages includes a deflector/separator having a gas inlet pipe and a gas outlet pipe offset relative to each other on the periphery of the deflector/separator and arranged at a different height above a hopper, and wherein at least the uppermost heat exchange stage has a cyclone with the horizontal gas inlet pipe, the improvement wherein:
  (a) the deflector/separator has an upper portion of cylindrical cross-section above its hopper with which said gas inlet pipe and said gas outlet pipe communicate;
  (b) the gas inlet pipe and the gas outlet pipe are substantially horizontal and the gas inlet pipe communicates tangentially with said cylindrical upper portion; and
  (c) the individual heat exchange stages have material delivery lines which communicate with the respective deflector/separator gas inlet pipe of the heat exchange stage immediately below.

2. A heat exchanger according to claim 1 wherein the gas outlet pipe communicates radially with the cylindrical upper portion of the deflector/separator.

3. A heat exchanger according to claim 1 wherein the amount of offset between the axes of said gas inlet pipe and outlet pipe is about 0.5 to 1.0 times the height of the gas inlet pipe.

4. A heat exchanger according to claim 1 wherein the amount of offset between the axes of said gas inlet pipe and outlet pipe is about 0.6 to 0.8 times the height of the gas inlet pipe.

5. A heat exchanger according to claim 1 wherein the gas inlet pipe is arranged at a level higher than that of the gas outlet pipe.

6. A heat exchanger according to claim 1 wherein the gas inlet pipe is arranged at a level lower than that of the gas outlet pipe.

7. A heat exchanger according to claim 1 wherein the gas inlet pipe and the gas outlet pipe are offset relative to each other on the periphery of the deflector/separator by up to 180°.

* * * * *